United States Patent Office.

JOHN W. RICHARDSON, OF OGDEN, OHIO, ASSIGNOR TO HIMSELF, DANIEL L. DAVIS, AND JEREMIAH KIMBROUGH, OF SAME PLACE.

Letters Patent No. 62,070, dated February 12, 1867.

IMPROVED PROCESS OF MANUFACTURING ALCOHOLIC SPIRITS.

The Schedule referred to in these Letters Patent and making part of the same.

TO ALL WHOM IT MAY CONCERN:

Be it known that I, JOHN W. RICHARDSON, of Ogden, Clinton county, Ohio, have invented a new and useful Process for Making Alcohol from the juice and skimmings of sorgho, imphee, and other northern sugar canes; and I do hereby declare the following to be a full, clear, and exact description thereof.

The first steps in my process consist in the preparation of the yeast. To prepare what I call my "stock yeast" I put twenty pounds ground barley malt into any suitable vessel, and pour thereupon three gallons of water at a temperature of 200° to 208° F. Let it stand about one hour, stirring often. Keep the vessel covered with a cloth to retain the steam, strain or draw off the liquid as free as possible from sediment into a suitable kettle, which should be of copper, and having immersed therein five pounds good English hops enclosed in a sack, boil the liquor down to half of its original quantity; then strain the same into an open-topped vessel, and maintain the liquor at a temperature of 88° to 90° F. In the course of twenty-four hours small bubbles will appear on the surface of the liquor, which are shortly succeeded by a foam or scum. The vessel must be kept perfectly still until the foam or scum subsides and the liquor becomes clear. The clear liquor is then to be immediately decanted off, carefully avoiding agitation, and bottled. It is then maintained at a temperature of 48° to 52° F. Care should be taken that the bottles are perfectly clean and sweet before bottling. The day preceding that on which it is intended to operate on the juice I prepare what I call the "night yeast," as follows: I take of water, at a temperature of 208° to 210° F., six gallons; rye meal, ground moderately fine, sixteen pounds; barley malt, ground coarse, five pounds; stir them well together, then stand four to six hours. Add to this yeast half a pint of the stock yeast; let it stand twelve to fifteen hours at 55° to 65° F. To the yeast thus prepared, called "day yeast," I add thirty-six gallons of the sorgho or imphee juice or skimmings at 15° saccharometer, and let it stand until vinous fermentation ceases. Then distill over, running the "wine" down as low as ten or even five per cent. The "low wine" thus left is to be used for "backing" in the next batch of fermented juice or skimmings. The liquor thus obtained by the first distillation may be "doubled" or redistilled till it reaches seventy-six per cent., ninety-two per cent., ninety-six per cent., ninety-eight per cent., and so on, at the pleasure of the operator; but ninety-six per cent. is as high as should be attempted in an ordinary still, a higher percentage being attended with great danger of fire.

I claim herein as new, and of my invention—

The process of manufacturing alcohol from the juice or skimmings of sorgho or other (so called) "northern" cane, substantially as described.

In testimony of which invention I hereunto set my hand.

JOHN W. RICHARDSON.

Witnesses:
   GEO. H. KNIGHT,
   JAMES H. LAYMAN.